(12) United States Patent  
Peura

(10) Patent No.: US 6,557,677 B2
(45) Date of Patent: May 6, 2003

(54) ACTIVE BI-DIRECTIONAL OVERRUNNING CLUTCH INDEXING

(75) Inventor: Brent Peura, Farmington, MI (US)

(73) Assignee: GKN Automotive, Inc., Auburn Hills, MI (US)

( * ) Notice: Subject to any disclaimer, the term of this patent is extended or adjusted under 35 U.S.C. 154(b) by 152 days.

(21) Appl. No.: 09/754,771

(22) Filed: Jan. 4, 2001

(65) Prior Publication Data

US 2002/0175038 A1 Nov. 28, 2002

(51) Int. Cl.⁷ .................. B60K 17/354; B60K 23/08
(52) U.S. Cl. .................. 192/3.56; 180/247; 192/20; 192/36; 192/38; 192/84.6
(58) Field of Search .................. 192/3.56, 20, 21, 192/38, 44, 47, 84.6, 35, 36; 180/247, 245, 246

(56) References Cited

U.S. PATENT DOCUMENTS

| | | | | |
|---|---|---|---|---|
| 3,300,002 A | * | 1/1967 | Roper | 192/38 |
| 4,667,767 A | * | 5/1987 | Shea et al. | 192/44 |
| 5,025,902 A | * | 6/1991 | Imai et al. | 192/44 |
| 5,429,218 A | * | 7/1995 | Itoh et al. | 192/38 |
| 5,443,147 A | * | 8/1995 | Gratzer | 192/44 |
| 5,547,054 A | * | 8/1996 | Gratzer | 192/35 |
| 5,549,187 A | * | 8/1996 | Kofler | 192/38 |
| 5,915,514 A | * | 6/1999 | Nojiri et al. | 192/38 |
| 6,123,183 A | * | 9/2000 | Ito et al. | 192/38 |
| 6,257,386 B1 | * | 7/2001 | Saito et al. | 192/38 |
| 6,446,773 B2 | * | 9/2002 | Kwoka | 192/35 |
| 2002/0063027 A1 | * | 11/2000 | Karambelas et al. | 192/35 |

* cited by examiner

Primary Examiner—Rodney H Bonck
(74) Attorney, Agent, or Firm—Mick A. Nylander

(57) ABSTRACT

An active bi-directional overrunning clutch that includes an oil housing. The clutch also includes a flange rotatably supported with respect to the oil housing. An input shaft is connected to the flange. The clutch further includes a plurality of rollers contacting the input shaft and a coupling. A roller cage positions the plurality of rollers with respect to the input shaft and coupling. The friction ground ring is in contact with the roller cage. The clutch also includes a worm gear in contact with the friction member.

9 Claims, 4 Drawing Sheets

ACTIVE BI-DIRECTIONAL OVERRUNNING CLUTCH INDEXING

TECHNICAL FIELD

The present invention relates to clutches, and more particularly, relates to an active indexing bi-directional overrunning clutch.

BACKGROUND ART

In a typical all wheel drive system, a front axle is a primary drive, while torque to the rear axle is transferred if and when the average speed of the front wheels is faster than the average speed of the rear wheels. The torque transfer generally occurs if the front wheels have excessive slip and it also may occur during low speed cornering situations. A clutch works as a mechanical disconnect which prevents torque from being transferred from the rear axle to the front axle. Currently known in the prior art are single direction clutches and bi-directional overrunning clutches and also clutches that use hydraulic systems to effect changes thereon. The bi-directional overrunning clutch differs from the single directional, because it works in both the clockwise and counter clockwise rotational directions. With the bi-directional clutch, if the output of the rear axle is rotating faster in one direction than the input from the front axle there is no torque transmission but if the input speed is equal to the output speed the unit will lock. Also, while in four wheel drive and in the reverse gear, the overrunning clutch locking function direction must be changed from the forward direction to the reverse direction. The bi-directional clutch will switch the operation mode dependent on the prop shaft or input speed direction. The use of the bi-directional overrunning clutch provides benefits with regards to braking, stability, handling, and drive line durability.

In a typical ABS braking event, disconnecting the front and rear drive line during braking helps to maintain braking stability. During the ABS braking event the locking of the rear wheels must be avoided for stability reasons and hence, the brake systems are designed to lock the front wheels first. During an ABS event, torque transfer from the rear axle to the front axle may disturb the braking system because of potential instabilities on the slippery surfaces. The use of a bi-directional overrunning clutch will decouple the rear drive line once the rear wheels spin faster than the front wheels and will provide excellent braking stability.

A bi-directional clutch also reduces likelihood of throttle off over steering during cornering of the vehicle. During a throttle off maneuver the clutch will decouple the rear drive line thus transferring all the engine braking torque to the front wheels which reduces the chance of a lateral slip on the rear axle. Therefore, the vehicle tends to under steer on a throttle off condition, a situation which is generally considered easier to manage by the average vehicle operator.

Bi-directional clutches have provided several advantages to the all wheel drive systems. Problems may occur during low speed when a vehicle is in a reverse rolling position and the vehicle operator then selects a drive position. After acceleration backlash may occur in the drive line which allows inertia in the engine and other components to build thus transmitting a torque to the rear drive line which induces an engagement phenomenon within the bi-directional clutch mechanism as the vehicle drive line goes from a reverse gear to a forward gear. This phenomenon is often reported by vehicle owners and is undesirable. Therefore, there is a need in the art for a bi-directional clutch mechanism that has active indexing which will reduce the engagement phenomenon associated with a switch from a forward to reverse gear or reverse to forward gear in an all wheel drive vehicle system.

BRIEF SUMMARY OF THE INVENTION

One object of the present invention is to provide an active bi-directional overrunning clutch capable of being indexed.

Another object of the present invention is to provide an active low speed worm gear bi-directional overrunning clutch.

Yet a further object of the present invention is to provide a clutch with active indexing that will reduce the clunk phenomenon of prior art bi-directional clutch mechanisms.

Another object of the present invention is to provide a clutch that will index during rotation reversal before torque is transmitted through a prop shaft of a vehicle.

Yet a further object of the present invention is to reduce the speed difference between the prop shaft and the rear axle pinion shaft which will lock the clutch before any torque transmission.

To achieve the foregoing objects the active bi-directional overrunning clutch includes an oil housing. The clutch also includes a flange rotatably supported with respect to the oil housing. An input shaft is connected to the flange. A plurality of rollers are in contact with the input shaft and a coupling. The clutch also includes a roller cage wherein that roller cage positions the plurality of rollers with respect to the input shaft and the coupling. The clutch further includes a friction ground member in contact with the roller cage and a worm gear in contact with the friction member.

One advantage of the present invention is that active indexing of a bi-directional clutch will occur prior to torque transfer via an electric motor.

A further advantage of the present invention is the reduction of the clunk phenomenon by active indexing of the bi-directional clutch mechanism.

A further advantage of the present invention is the reduction in speed difference between the prop shaft and the rear axle pinion shaft because of the indexing of the clutch, which therefore, locks the clutch before any torque transmission.

A further advantage of the present invention is a low speed indexing of the clutch from either the reverse to the forward gear or vice versa.

Other objects, features and advantages of the present invention will become apparent from the subsequent description and appended claims, taken in conjunction with the accompanying drawings.

BEST MODE FOR CARRYING OUT THE INVENTION

Figure 1:
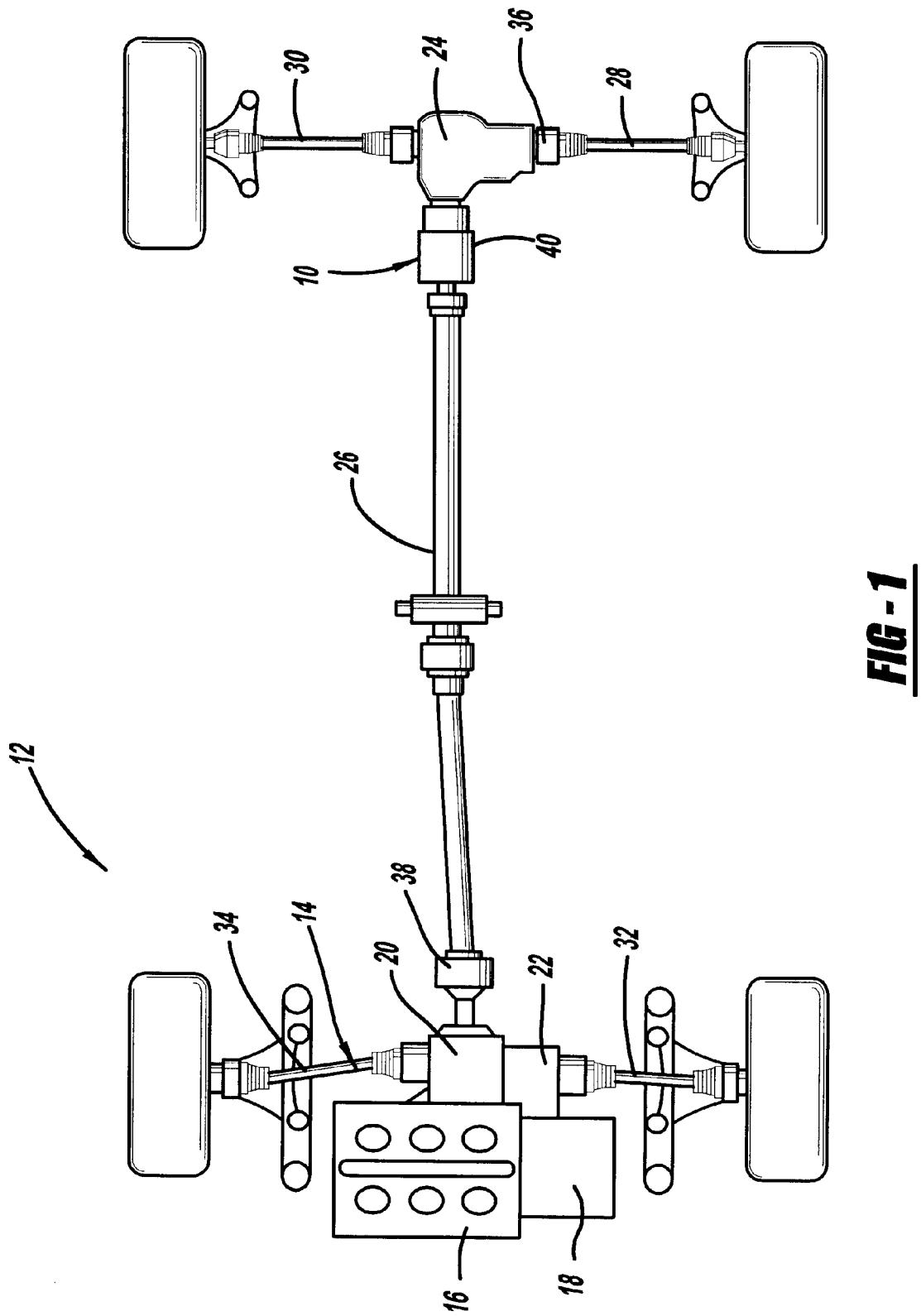
FIG. 1 shows a plan view of a vehicle drive line.

Referring to the drawings, an active bi-directional overrunning clutch 10 according to the present invention is shown. FIG. 1 schematically illustrates an all wheel drive or four wheel drive motor vehicle that is primarily a front wheel driven vehicle, however, the present invention can be used on a primary rear wheel driven vehicle as well.

The motor vehicle 12 as shown in FIG. 1 is primarily driven by a front axle 14. The motor vehicle 12 is an all wheel drive or a four wheel drive vehicle and is driven by power transferred from the engine 16 through a transaxle or gear box 18, which may be an automatic or a manual gear box, into the front differential 22 of the drive train assembly and finally on through to the power takeoff unit 20. In an all wheel drive vehicle power is delivered to the rear differential 24 via a propeller shaft or driving shaft 26 when there is a demand for it. At the rear differential 24 power is split to a left rear half shaft 28 and a right rear half shaft 30 for distribution to the wheels at the rear of the vehicle. The front differential 22 splits power and slip or spin from the left front half shaft 32 and the right front half shaft 34. An all wheel drive vehicle distributes power to both the rear differential 24 and the front differential 22 via a distributing drive. In this all wheel drive vehicle configuration either the front axle or the rear axle 36 is the primary driven axle with the other axle only receiving most of the power 14 when needed. The preferred embodiment of the present invention is an all wheel drive vehicle wherein an active bi-directional overrunning clutch 10 is located within or near the rear differential 24 and acts from there to distribute torque to the rear axle 36 of the vehicle during front wheel spin conditions. However, it should be noted that a primary driven rear axle vehicle may also be used with the active bi-directional overrunning clutch 10 installed at or near the front differential 22 of such a vehicle.

The drive train of the vehicle 12 shown in FIG. 1 includes a propeller shaft or drive shaft 26 which transmits power from a power take off unit 38 to the rear differential 24. The rear differential drive 24 includes an axle or oil housing 40 which includes a bi-directional overrunning clutch 10 and a differential housing 42 which is supported about a rotational axis. The differential housing is driven by a vehicle gear box via a driving gear. The bi-directional overrunning clutch 10 connects to the differential housing 42 via a rear pinion shaft 44 and will only transmit torque to the rear axle 36 when the front axle 14 or front wheels are in a spin or slip condition. When a gear selection has been made by the operator, for instance into a forward gear and then into a reverse gear or the opposite, i.e., a reverse gear was selected and then a forward gear selected, the bi-directional overrunning clutch of prior art devices made an engagement noise which occurs when the rotation of the clutch is changed abruptly from a counter clockwise direction to a clockwise direction or from a clockwise direction to a counter clockwise direction. This engagement phenomenon is noticeable to operators of the vehicle and is frequently reported as being undesirable.

Figure 2:
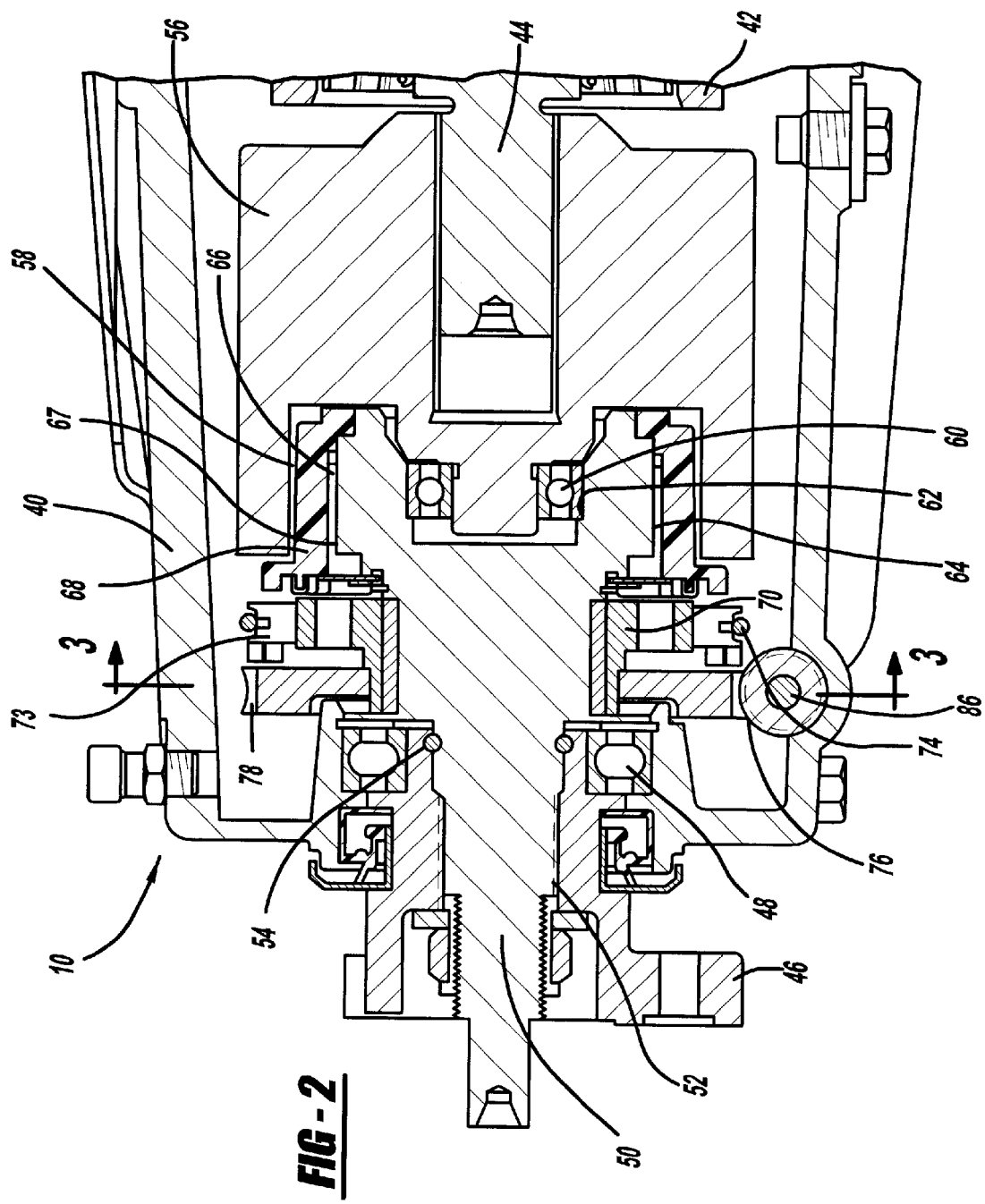
FIG. 2 shows a cross section of the present invention.

FIG. 2 shows a cross section of the active bi-directional overrunning clutch 10. The clutch 10 is located in an oil housing 40, which is connected to a rear differential 24, (see FIG. 1), and then on to the rear axle 36 and side shafts 28, 30 and finally to the wheels. A flange 46 is connected to the prop shaft 26 which is connected on the opposite end to the front differential 22 and front axle 14. The flange 46 is rotatingly supported within the oil housing 40 by bearings 48. Located within the flange 46 is the input shaft 50 which is connected to the prop shaft 26 via the flange 46. The input shaft 50 is secured within the flange 46 via a network of teeth 52 that interact with the input shaft 50 and the surface of the flange 46. A seal 54 is used as a medium between the input shaft 50 and the flange 46. The input shaft 50 of the bi-directional overrunning clutch 10 rotates at the speed the prop shaft 26 is receiving from the front differential 22 and in whatever direction, i.e., clockwise or counterclockwise, the prop shaft 26 is driving. At one end of the input shaft 50 is a viscous coupling 56, it should be noted that any other type of coupling may be used but in the preferred embodiment a viscous coupling is the preferred choice. The viscous coupling 56 is integrated with the bi-directional overrunning clutch outer race. The rear axle output is transmitted to and through the rear axle pinion shaft 44. The viscous coupling 56 smooths the transition between the speed of the input shaft 50 and the speed going to the axle output shaft 44. The viscous coupling 56 contacts a second bearing 60, which also contacts an inner surface 62 of the input shaft 50.

Figure 3:
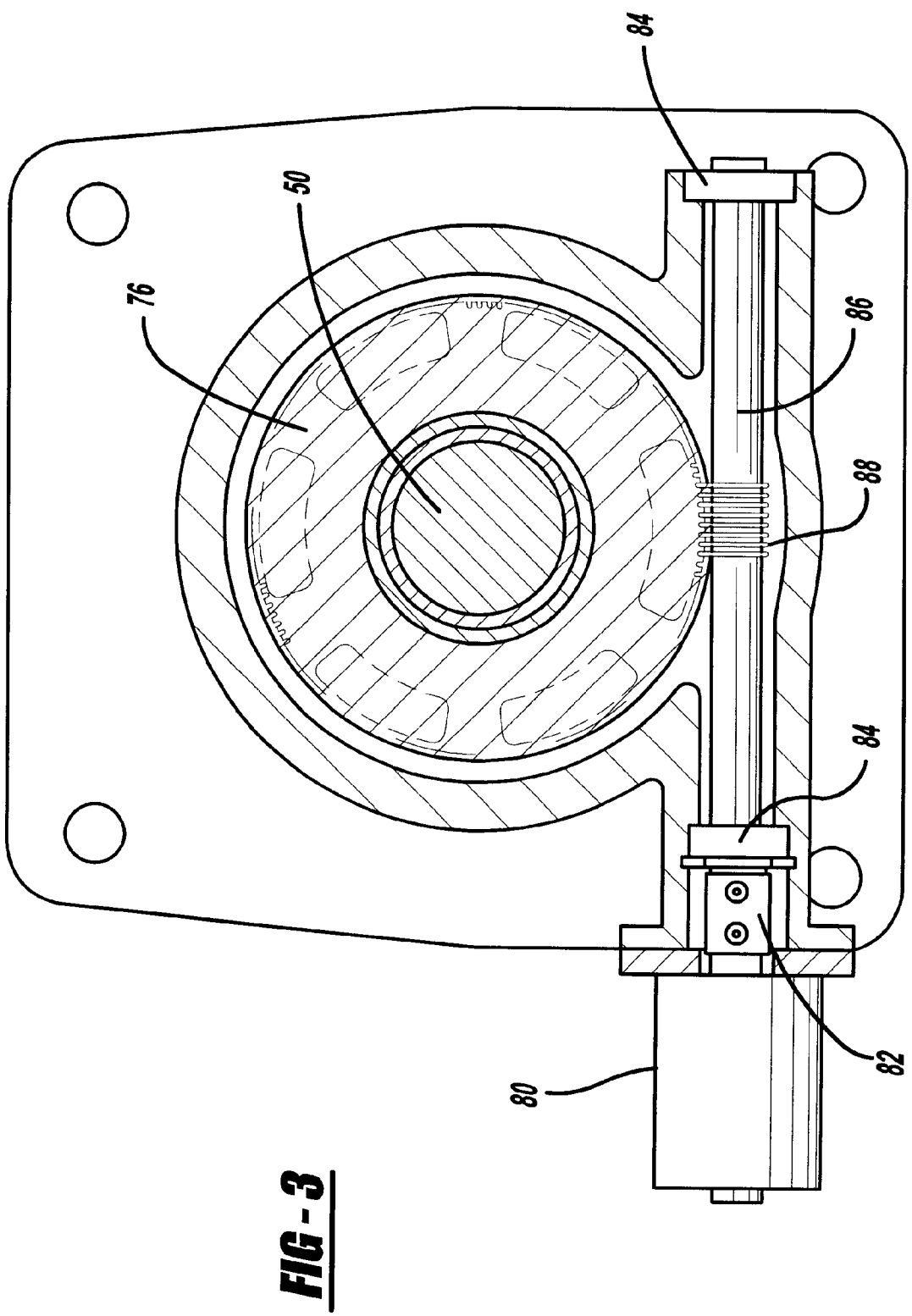
FIG. 3 shows a partial cross section taken from the front of the present invention.
Figure 4:
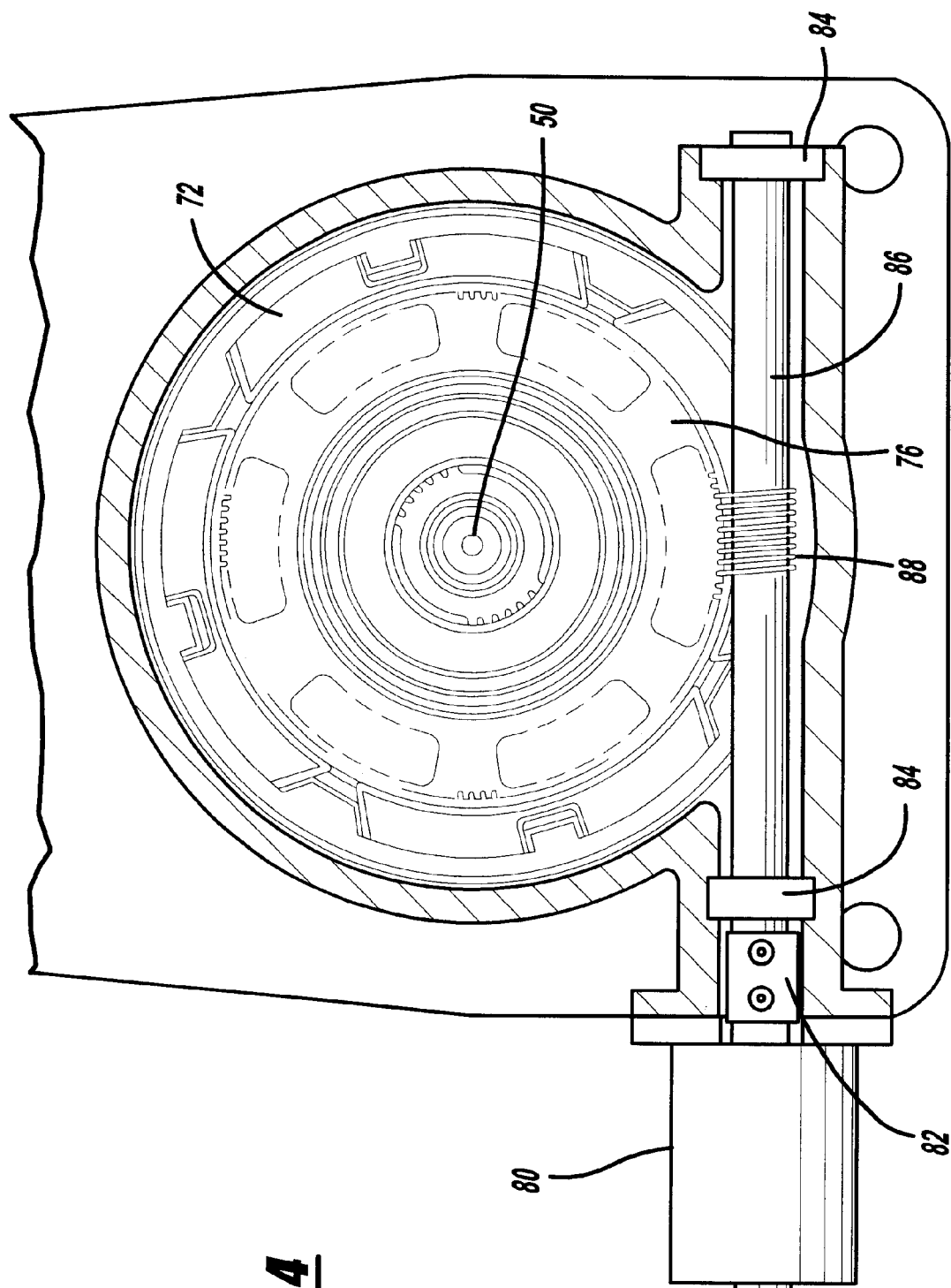
FIG. 4 shows a front end view of the present invention according to the present invention.

One end of the input shaft 50 includes a plurality of flat surfaces or flats 64. The flat surfaces 64 are on the outer circumference of the input shaft 50. A plurality of rollers 66 are in contact with both the flat surfaces 64 of the input shaft and a surface of the outer race 58. The rollers 66 are held in position on each flat surface 64 by a roller cage 68 which extends in an area between the outer race surface 58 and the input shaft flat surfaces 64. The roller 66 is free to rotate in either direction, i.e., clockwise or counterclockwise with respect to the roller cage 68 thus allowing the roller 66 to position from one end of the flat surface 64 of the input shaft to the other end of a flat surface 64 of the input shaft. This applies to each and every roller 66 on each and every flat surface 64 around the circumference of the input shaft 50. A friction grounding element or ring 70 axially contacts the roller cage 68 at a top surface thereof. The friction grounding element 70 includes a plurality of friction brake shoes 72 as shown in FIGS. 2,3, and 4. The brake shoes 72 are held into place and provide an element of resistance to the friction ground element 70 via a spring 74. The friction brake shoes 72 are positioned within orifices that are located around an upper circumference of the roller cage 68 and contact the friction grounding element 70, but is not rigidly connected to the friction grounding element 70. The friction grounding element 70 further includes a worm gear 76 that includes a plurality of teeth 78 on an outer circumference thereof. An electric motor 80 is positioned inside or outside the oil housing 40 such that it is mechanically grounded to the oil housing 40. The electric motor 80 is connected via a coupling 82 and bearings 84 to the rod 86 which rotates the gear attached to the friction grounding element 70. The motor 80 is capable of rotating in a clockwise direction or a counter clockwise direction thus rotating the worm gear 76 in either a clockwise direction or a counter clockwise and influencing the rollers 66 with respect to the flat surfaces 64 of the input shaft. The rod 86 of the worm gear 76 includes a plurality of threads 88 such that they engage the teeth 78 of the worm gear 76 and provide the necessary torque to rotate the worm gear 76 in either the clockwise or counter clockwise direction.

The bi-directional overrunning clutch 10 engages and transmits power to the rear wheels during a slip condition of the front wheels on a primary driven front wheel vehicle and also during tight cornering low speed situations. During normal driving conditions of the all wheel drive vehicle the bi-directional overrunning clutch 10 has the input shaft 50, which is directly connected to the front axle 14 via the prop shaft 26, and the outer viscous coupling race which is connected to the rear axle pinion of the rear axle 36 running at different speeds due to different gear ratios. The outer race 58 which is connected to the rear axle 36 tends to spin faster than the input shaft 50. The bi-directional overrunning clutch 10 at low vehicle speeds tries to drag the friction shoes 72 and keep the roller cage 68 and hence the rollers 66 to the left side or forward gear side of the flat surfaces of the input shaft 50. During this mode, the rollers 66 are spinning in a clockwise direction with and in the same direction as the outer race 58 and rear axle 36 and no torque is being transferred. However, during a front wheel slip condition in the forward vehicle direction the prop shaft 26 and rear axle pinion shaft 44 develops a difference in speed that will decrease to zero when the speeds equal each other and then the input shaft 50 becomes the driving member thus compressing the rollers 66 against the outer race 58 of the coupling 56. This locks the input shaft 50 with the outer race 58 and transmits torque to the housing of the viscous coupling 56 that in turn transmits the torque to the rear axle pinion 44. The rollers 66 are pinched during this locked condition and stay locked until a torque reversal, i.e., no front wheel slip occurs.

The roller cage 68 positions the rollers 66 on the input shaft flat surfaces 64 during low and high speed overrun and during initial lock up of the bi-directional overrunning clutch 10. The roller cage 68 is rotating at all times at the input shaft speed. During low speeds the friction brake shoes 72 are pressed against a friction ground with the spring 74. This creates a drag force on the roller cage 68 where that drag force positions the cage 68. This positioning of the cage 68 in turn positions the rollers 66 to one side of the flat surface 64. The direction of this drag force is dependent on the input rotational direction. The rollers 66 are always in constant contact of the outer race 58 during any speed. This contact tends to spin the rollers 66 as well as create a drag force on the roller 66. During overrun conditions the outer race 58 is rotating faster than the input shaft 50. The direct force on the roller 66 as well as the outer race 58 rotating at a higher angular velocity forces the rollers 66 to traverse from one side of the flats 64 to the other.

During low speeds the brake shoes 72 counteract the drag effect to avoid excessive grounding during any change in direction i.e., reverse to forward or vice versa of the vehicle. The direction change effects the rotation of the prop shaft 26. The rollers 66 have to be indexed from the left side to the right side of the flat surfaces 64 of the input shaft by the worm gear unit 76, via the roller cage 68 to the appropriate flat surface side of the input shaft 50 to reduce the clunking effect which occurs if the rollers are not indexed and the rollers are suddenly, via a certain amount of torque, forced to the opposite side of the flat surfaces 64.

In operation the active indexing of the bi-directional overrunning clutch 10 is used to reduce the NVH phenomenon found with traditional bi-directional clutch mechanisms. The NVH effect tends to occur at low speeds after a shift from a forward gear to a reverse gear or the opposite reverse gear to a forward drive gear. The indexing of the bi-directional clutch 10 occurs during rotation reversal before any torque is transmitted through the prop shaft 26 to the viscous coupling 56 and on through to the rear axle 36. The motor 80 is in contact with to the worm drive 76 which is then connected to the friction grounding element 70. In the preferred embodiment the electric motor 80 is connected electronically to the transmission controller of the vehicle operating computer, however, it should be noted that the motor 80 can be connected to any of the onboard computers or sensors in the vehicle depending on weight, size and needs for the motor. The electric motor 80 is controlled by the use of simple computer logic programming. This programming adds a circuit that allows the electric motor 80 to index the rollers 66 from one side of the input shaft flat surfaces 64 to the second side of the input shaft flat surfaces 64 at a predetermined time. The motor 80 remains on for a predetermined time interval such as approximately two seconds depending on a number of factors such as the speed of the spinning front wheels, etc. When the rollers are indexed or moved before any torque transfer, no backlash occurs in the bi-directional overrunning clutch 10. This also allows the speed difference across the bi-directional overrunning clutch 10 to be reduced thus lessening the clunk phenomenon.

When the operator of the vehicle selects a drive or forward gear after being in a reverse gear, the computer logic or replay first determines which type of gear, reverse and not forward in this case, was selected and then sends a signal to the motor 80 to index the roller 66 to the reverse side of the flat surfaces of the input shaft 50. This all occurs during the lag the transmission and engine have because of the front wheel spin in the reverse direction by the vehicle. The rollers 66 are moved to the reverse side of the flat surfaces of the input shaft 50 before any torque transmission is applied to the viscous coupling 56 and then on to the rear axle 36. In the preferred embodiment the motor 80 is turned on for a period of two minutes and then turned off after the two minute interval has passed until the opposite direction gear is selected. It should be noted that any other time interval from a few seconds to multiple minutes may be used depending on factors and environmental conditions of the drive train system. If a forward gear is selected the logic sends an electronic signal to the motor 80 and indexes the rollers 66 to the forward drive side of the flat surfaces of the input shaft 50. The transmission and engine will have a lag when the front wheels incur a spin condition thus delaying the transmission of torque for a predetermined time. Hence, the motor 80 will be left on, assuring indexing of the rollers 66, for a period of two minutes as was the case if the shift lever is placed in the reverse selection. Therefore, even if the vehicle is rolling in a reverse direction and the operator selects a drive or forward gear, then accelerates, the electric motor 80, upon receiving the electronic signal that a forward drive gear was selected, indexes the rollers 66 for a period of two minutes thus reducing backlash or NVH phenomenon in the drive line. This occurs even though the inertia of the engine and the transmission have built up, but the rollers 66 have indexed before any torque was transmitted. This reduction of the back lash of the rear drive line system allows for less speed difference between the input prop shaft 26 and the rear axle pinion shaft 94 and assures that the bi-directional overrunning clutch 10 is locked before any torque transmission occurs. It should be noted that the appropriate worm gear drive or high ratio drive is preferred so that the friction ground ring will not backdrive the motor.

The present invention has been described in an illustrative manner, it is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. An active bi-directional clutch for use on a vehicle, the vehicle having a propshaft between a rear axle and a front axle, said clutch comprising:

a flange;

an input shaft rotatably fixed with respect to said flange, said input shaft having a plurality of flat surfaces;

a plurality of rollers contacting said input shaft;

a viscous coupling contacting said plurality of rollers, said viscous coupling rotatably fixed to a pinion shaft of said rear axle;

a roller cage, said roller cage positions said plurality of rollers with respect to said flat surfaces of said input shaft;

a friction ground member in contact with said roller cage, said friction ground member having a plurality of teeth on an outer circumference thereof; and a worm gear in contact with said plurality of teeth of said friction ground member.

2. The clutch of claim 1 further including an electric motor, said electric motor rotates said worm gear.

3. The clutch of claim 2 wherein said electric motor responds to an electric signal from a controller, said signal indicates which gear the vehicle is in.

4. The clutch of claim 3 wherein said signal will activate said electric motor and rotate said worm gear indexing said rollers to a predetermined position on said flat surfaces.

5. The clutch of claim 4 wherein said indexing occurs at low vehicle speeds and during reverse of direction.

6. The clutch of claim 5 wherein said rollers predetermined positions correspond to a reverse gear side or drive gear side of said flat surfaces.

7. The clutch of claim 6 wherein said indexing of said rollers occurs for a predetermined time interval.

8. The clutch of claim 4 wherein indexing is active, said indexing allows a speed difference between said propshaft and said rear axle to be reduced.

9. The clutch of claim 8 wherein said speed reduction allows the clutch to lock before any torque transmission.

* * * * *